United States Patent [19]

Yokote

[11] Patent Number: 5,050,905
[45] Date of Patent: Sep. 24, 1991

[54] GUIDE TUBE FOR PASSIVE SEAT BELT SYSTEM

[75] Inventor: Yoshihiro Yokote, Yokohama, Japan

[73] Assignee: Nippon Seiko Kabushiki Kaisha, Tokyo, Japan

[21] Appl. No.: 327,103

[22] Filed: Mar. 22, 1989

[30] Foreign Application Priority Data

Mar. 23, 1988 [JP] Japan .............................. 63-38075[U]
Mar. 23, 1988 [JP] Japan .............................. 63-38076[U]
Mar. 23, 1988 [JP] Japan .............................. 63-38077[U]

[51] Int. Cl.$^5$ ........................................... B60R 22/06
[52] U.S. Cl. ................................................. 280/804
[58] Field of Search ............... 280/804, 806, 801, 808, 280/803

[56] References Cited

U.S. PATENT DOCUMENTS

| 4,498,690 | 2/1985 | Takada | 280/804 |
| 4,560,187 | 12/1985 | Yoshitsugu | 280/804 |
| 4,575,120 | 3/1986 | Volk et al. | 280/804 |
| 4,635,964 | 1/1987 | Ryu | 280/804 |
| 4,659,107 | 4/1987 | Yokote | 280/804 |
| 4,671,537 | 6/1987 | Yoshitsugu | 280/804 |
| 4,784,407 | 11/1988 | Verellen et al. | 280/804 |

FOREIGN PATENT DOCUMENTS 62-8856  1/1987  Japan .

Primary Examiner—Richard A. Bertsch
Attorney, Agent, or Firm—Wegner, Cantor, Mueller & Player

[57] ABSTRACT

A guide tube for a passive seat belt system is disclosed. The guide tube is adapted to be arranged along a vehicle body to guide a slider drive member. The guide tube is constructed of a first guide tube member for allowing the slider drive member to extent therethrough and a second guide tube member having higher flexural rigidity than at least the first guide tube member and adapted to be mounted on the vehicle body by means of at least one tube bracket. The first guide tube member is fitted within the second guide tube member.

8 Claims, 5 Drawing Sheets

GUIDE TUBE FOR PASSIVE SEAT BELT SYSTEM

BACKGROUND OF THE INVENTION

1. Field of the Invention:

This invention relates to a guide tube for guiding a slider drive member in a passive seat belt system of the type that an occupant-restraining webbing is automatically brought into contact with or brought away from the body of an occupant.

2. Description of the Related Art

Figure 12:
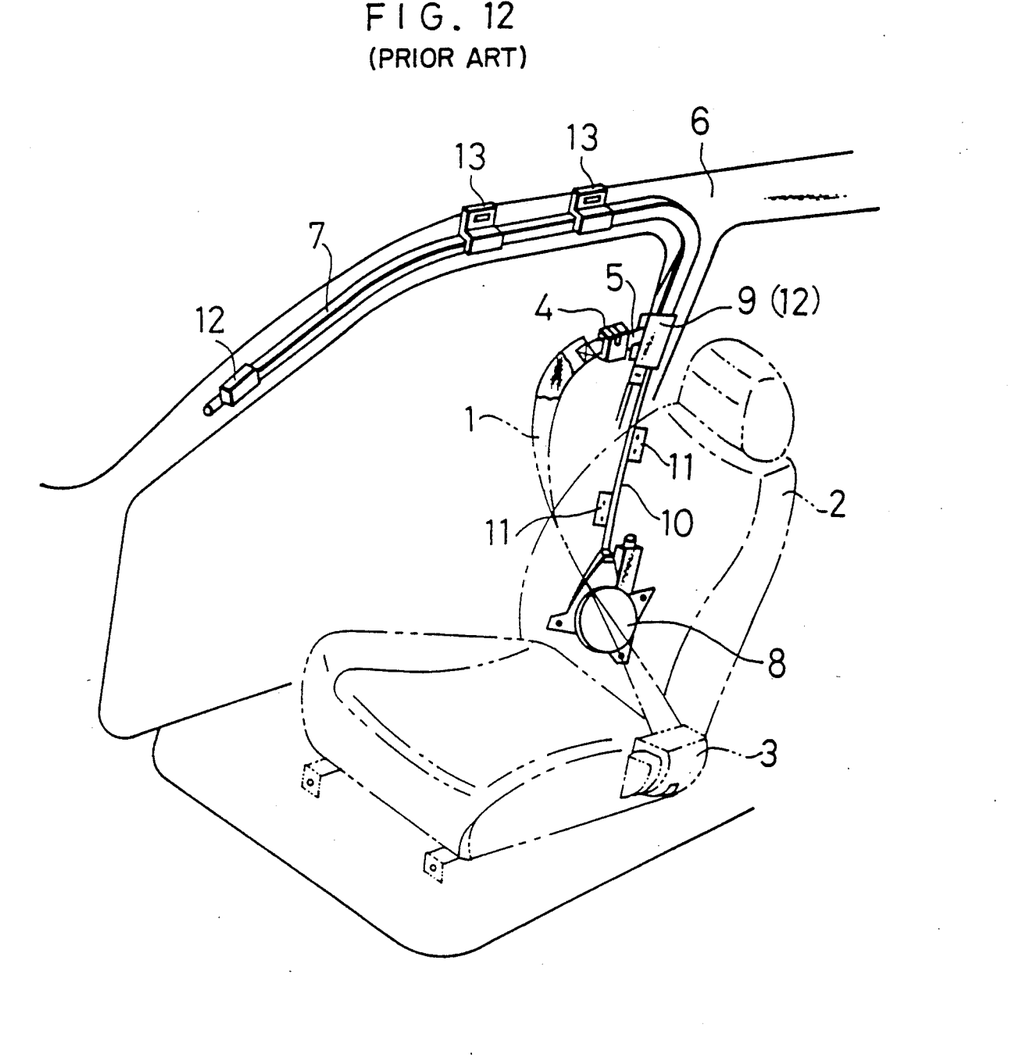
FIG. 12 is an overall schematic illustration showing one example of passive seat belt systems according to the prior art.
Figure 13:
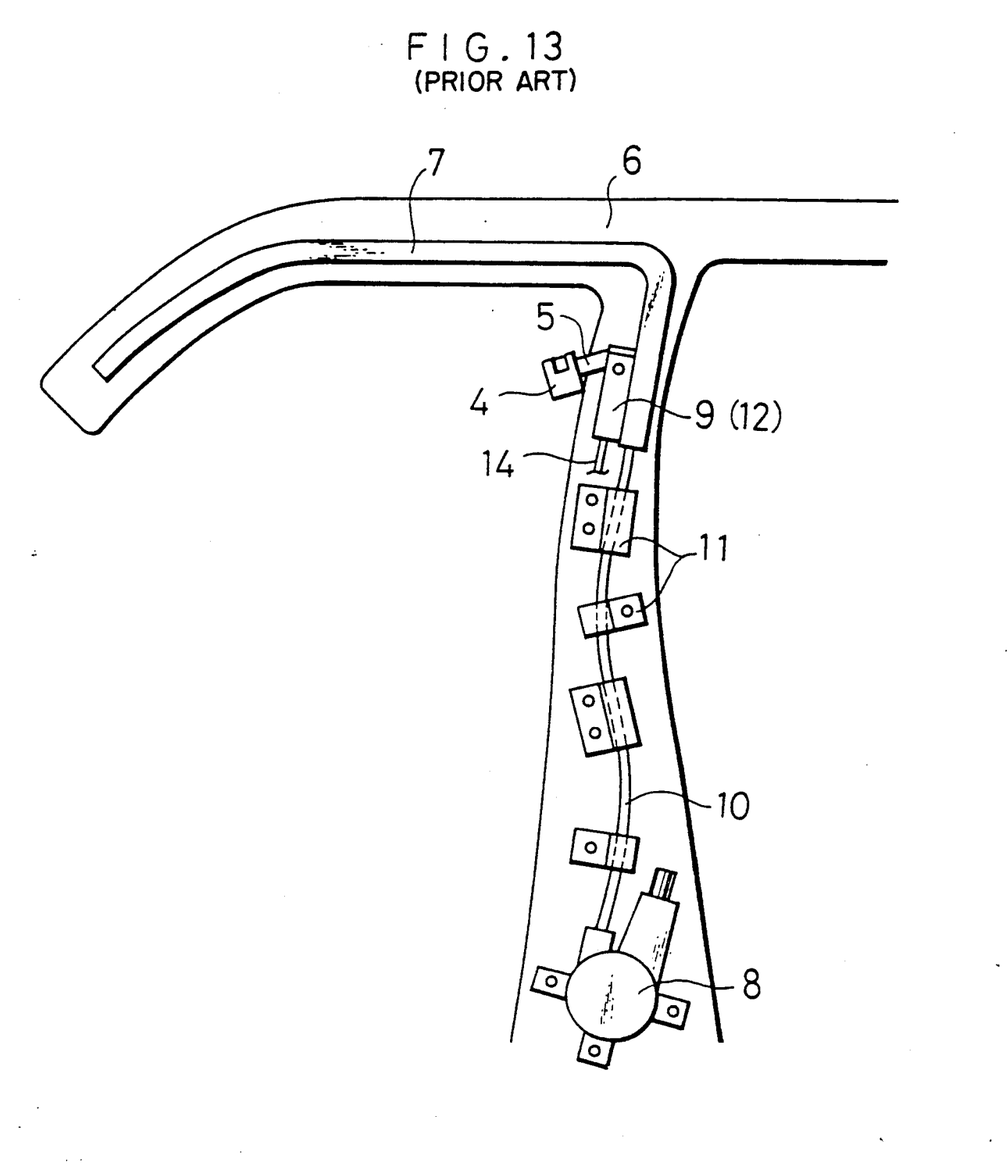
FIG. 13 is a fragmentary front elevation of the exemplary passive seat belt system of FIG. 12.

FIGS. 12 and 13 illustrate one example of passive seat belt systems known to date inter alia from from Japanese Utility Model Application Laid-Open Nos. 76555/1985, 61262/1986 and 8856/1987. A residual portion of an occupant-restraining webbing 1 is wound into an inner retractor 3 provided on a lower part of the inboard side wall of a seat 2, while the free end of the webbing 1 is fastened to a slider 5 by way of an emergency release buckle 4. The slider 5 is received within a slide rail 7 mounted on a roofside portion of the inner wall of a roof of a vehicle body 6 in such a way that the slider 5 is movable along the length of the vehicle body. The slider 5 is driven by an unillustrated drive member, such as a drive wire or drive tape, which is paid out and taken up by a drive unit 8. The drive unit 8 is actuated responsive to each opening or closure of an associated door. Although not seen in the drawings, there is a reel inside the drive unit 8. The reel is connected to a motor which is not seen either in the drawings. The drive member is wound on the reel so that the drive member may be selectively paid out or taken up. An anchor latch 9 is provided at the rear end of the slide rail 7. Arranged between the anchor latch 9 and the drive unit 8 is a guide tube 10 made of a synthetic resin and adapted to guide the movement of the guide drive member.

Numeral 13 indicates rail brackets for mounting the slide rail 7 on the vehicle body 6.

By the way, the material and shape of the guide tube 10 are chosen to give low flexural rigidity so that the guide tube 10 may be bent three-dimensionally to conform in configuration with the inner wall of the vehicle body 6. Upon driving the slider 5, especially upon hindrance of smooth movement of slider 5 for some reasons, the drive member is prone to wavy deformation relative to the length thereof by the pushing force applied thereto. Once such a deformation takes place, the surface of the drive member is brought under pressure into contact the inner wall of the guide tube 10. There is thus the potential danger that the guide tube 10 itself may be bent into a wavy shape and the smooth movement of the drive member within the guide tube 10 may hence be impaired due to friction therebetween. To avoid such inconvenience, it has been the conventional practice to fix the guide tube 10 over substantially the entire length thereof on the vehicle body 6 by using many tube brackets 11 made of a metal, thereby preventing bending of the guide tube 10 itself.

When the guide tube 10 is arranged along the vehicle body, it has been the conventional practice to form the tube 10 with a synthetic resin material by extrusion, to insert the tube 10 through the tube brackets 11 and then to fix the tube brackets on the vehicle body by using bolts and nuts welded on the side of the vehicle body.

In addition, the slide rail 7 employed in the passive seat belt system is provided with limit switches 12, 12 for detecting movements of the slider 5 to predetermined front and rear positions of the vehicle body, respectively. Further, the emergency release buckle 4 is provided with a warning switch for detecting whether a tongue fastened to the free end of the webbing 1 is latched in the buckle 4. It is thus necessary to feed a current to these limit switches 12 and warning switch through wire harnesses 14. It has been the conventional practice to attach these wire harnesses 14 to the vehicle body subsequent to the mounting of the slide 7 on the vehicle body and then to connect them to the limit switches 12, 12 and warning switch respectively.

The above conventional practice has however led to the need for many tube brackets 11, many points on the vehicle body 6 for the attachment of the tube brackets 11 and many attachment steps for the tube brackets 11, thereby making it difficult to reduce the cost for the assembly and manufacture of a passive seat belt system.

It has also been necessary to fit the tube brackets 11 over the tube 10 and then to precisely position the tube brackets 11 relative to the tube 10. Here, fitting errors tend to occur. Further, the positions of the tube brackets 11 fixed on the tube 10 are usually out of registration with the positions of the nuts welded on the vehicle body so that the positions of the tube brackets 11 have to be adjusted before their attachment to the vehicle body.

It was contemplated of temporarily holding the tube brackets 11 on the tube 10 with an adhesive plastic tape or the like to position the former precisely on the latter. This method however required complex attachment steps, because the handling of the tape was inconvenient and the positions of the tube brackets 11 were susceptible to displacement.

In the above-described prior art, in addition to the guide tube 10, the wire harnesses 14 were also fixed at plural locations on a center pillar or the like of the vehicle body 6 by plural clips or similar means or on the guide tube 10 for the drive member by using an adhesive plastic tape or the like. This led to an increased assembly step number and increased part number and made it difficult to attach the wire harnesses 14 because of the cumbersome handling of the adhesive plastic tape. As a consequence, it was difficult to reduce the assembling and manufacturing cost.

SUMMARY OF THE INVENTION

It is an object of this invention to solve or at least reduce the above-described problems of the prior art.

In a first aspect of this invention, there is thus provided a guide tube for a passive seat belt system. The guide tube is adapted to be arranged along a vehicle body to guide a slider drive member. The guide tube comprises a first guide tube member for allowing the slider drive member to extend therethrough and a second guide tube member having higher flexural rigidity than at least the first guide tube member and adapted to be mounted on the vehicle body by means of at least one tube bracket, and the first guide tube member is fitted within the second guide tube member.

In a second aspect of this invention, at least one cut-off portion is formed in the guide tube in such a way that said cut-off portion extends in a direction perpendicular to the length of the guide tube, whereby a tube bracket may be fittingly received in said cut-off portion.

In a third aspect of this invention, the guide tube has an insertion portion formed integrally therewith and adapted to receive a wire harness therein.

In the first aspect of this invention, the first guide tube member for allowing the slider drive member to extend therethrough is fitted in the second guide tube member having higher flexural rigidity than the first guide tube member and adapted to be mounted on the vehicle body by means of the tube bracket. Therefore, the inner peripheral wall of the second guide tube member restricts bending of the first guide tube member itself. As a result, the guide tube is free from the problem that the surface of the drive member may be brought under pressure into contact with the inner wall of the guide tube to impair smooth movement of the drive member in the guide tube due to friction therebetween.

The second guide tube member has relatively high flexural rigidity. Accordingly, it is unnecessary to use many tube brackets upon attachment of the first guide tube member, thereby making it possible to reduce the cost for the assembly and manufacture of a passive seat belt system.

In the second aspect of this invention, the tube bracket can be attached to the guide tube by simply fitting the tube bracket into the cut-off portion formed in the guide tube. The position of the tube bracket is therefore automatically determined, so that the positioning of the tube bracket has been facilitated.

It is hence possible to omit the positioning step for the tube bracket. This permits a reduction in the number of steps and the accurate attachment of the tube bracket, thereby making it possible to reduce the assembling and manufacturing cost.

In the third aspect of this invention, the insertion portion adapted to receive the wire harness therein is formed integrally with the guide tube, it is no longer necessary to provide a wire harness additionally. It is only necessary to insert the wire harness through the insertion portion of the guide tube, so that the number of assembly steps is reduced to facilitate the assembly work and the assembly cost can be reduced.

Since the insertion portion can be formed by a one-piece forming technique or the like simultaneously with the production of the guide tube, the production cost of the guide tube is not increased substantially.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

With reference to the accompanying drawings, the embodiments of this invention will hereinafter be described. Since the overall construction of the passive seat belt is similar to the prior art, its description is omitted herein.

Figure 1:
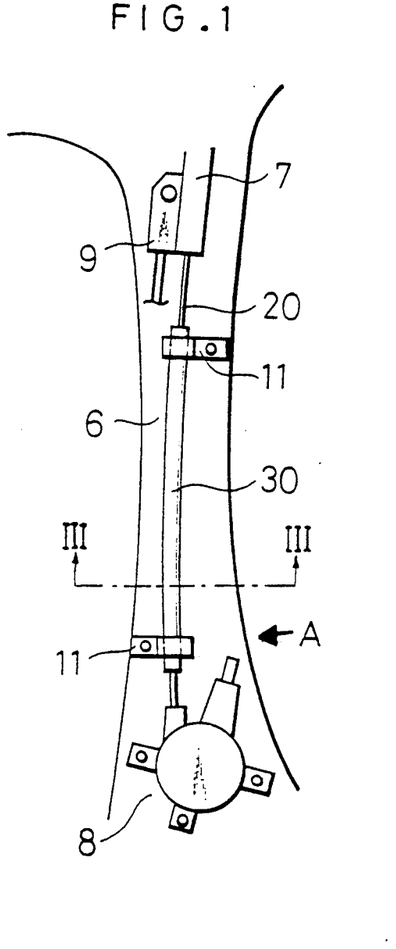
FIG. 1 is fragmentary front elevation of a passive seat belt system, showing a guide tube according to a first embodiment of this invention and its peripheral members.
Figure 2:
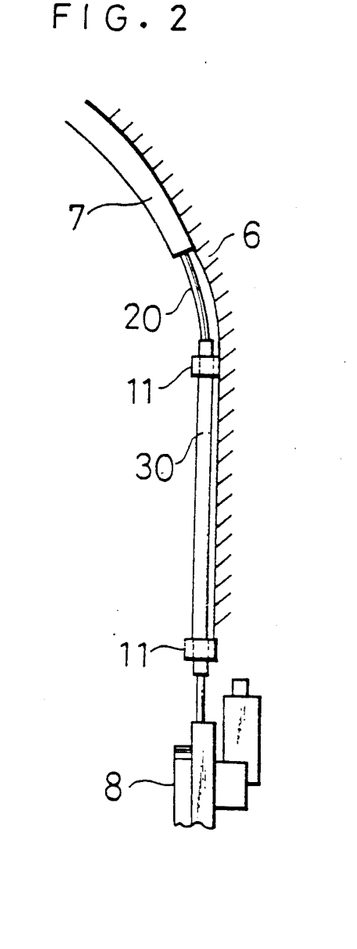
FIG. 2 is a fragmentary side elevation seen in the direction indicated by arrow A of FIG. 1.

FIGS. 1 and 2 shows the guide tube according to the first embodiment of this invention.

In these drawings, a first guide tube member 20 adapted to guide the movement of the drive member is arranged along the vehicle body 6 between the drive unit 8, in which the reel with a residual portion of the drive member wound thereon is accommodated, and the anchor latch 9.

The first guide tube member 20 is formed of a material having low flexural rigidity so that the first guide tube member 20 may be bent three-dimensionally to conform with the inner wall of the vehicle body 6.

Fitted over the outer circumferential wall of the first guide tube member 20 is a second guide tube member 30 having higher flexural rigidness than the first guide tube member 20. Further, the second guide tube member 30 is attached at both end portions thereof to the vehicle body 6 by known tube brackets 11, 11.

Figure 3:
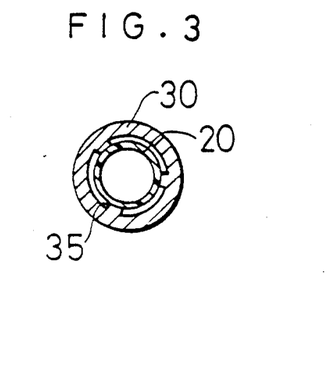
FIG. 3 is a transverse cross-section of the guide tube of the first embodiment, taken in the direction of arrows III—III of FIG. 1.

As is shown in FIG. 3, the first guide tube member 20 is disposed within the second guide tube member 30 in such a way that the outer circumferential wall of the first guide tube member 20 is substantially maintained in contact with tips of engaging portions 35 formed with equal angular intervals on the inner circumferential wall of the second guide tube member 30.

Upon driving the slider 5, especially upon hindrance of smooth movement of slider 5 for some reasons, the first guide tube member 20 may start undergoing deformation into a wavy form relative to the length thereof by the pushing force applied thereto because of its low flexural rigidity. However, the inner circumferential wall of the second guide tube member 30 having the higher flexural rigidity restricts the bending of the first guide tube member 20 itself. As a result, it is possible to avoid such a problem that the surface of the drive member would be brought under pressure into contact with the inner circumferential wall of the first guide tube member 20 and the smooth movement of the drive member within the first guide tube member 20 could hence be impeded.

Since the second guide tube member 30 has relatively high flexural rigidity, the member 30 itself is not bent even if it is not attached to the vehicle body 6 via many tube brackets 11. It is thus possible to reduce the number of tube brackets 11 needed to attach the second guide tube member 30 to the vehicle body 6. As a result, it is possible to reduce the cost for the assembly and manufacture of a passive seat belt system.

Figure 4:
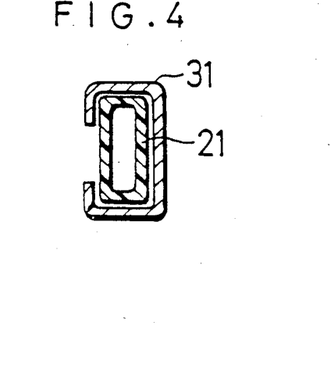
FIG. 4 is a transverse cross-section of a guide tube according to a second embodiment of this invention.

In the first embodiment described above, the first guide tube member 20 and second guide tube member 30 have been described as having a ring-shaped transverse cross-section. It is however not necessary to limit the transverse cross-sectional shape of each of the guide tube members 20, 30 to such a ring shape. It is possible to use as the first guide tube member 20 a guide tube member having a transverse cross-section in the form of a substantially square frame like the second embodiment shown in FIG. 4 or as the second guide tube member 30 a guide tube member having a substantially C-shaped transverse cross-section. Besides, guide tube members having various transverse cross-sectional shapes can also be used. In short, so long as bending of the first guide tube member 20 can be prevented, the first guide tube member 20 may take any transverse cross-sectional shape and the second guide tube member 30 may have any transverse cross-sectional shape conforming with the transverse cross-section of the first guide tube member 20.

Further, the engaging portions 35 formed on the inner circumferential wall of the second guide tube member 30 may be projections in the forms of beads. As an alternative, they may be ridges or spiral ridges extending along the axis of the second guide tube member 30. Needless to say, the engaging portions 35 may be omitted and instead, bending of the first guide tube member 20 may be limited by the entire inner circumferential wall of the second guide tube member 30.

Figure 5:
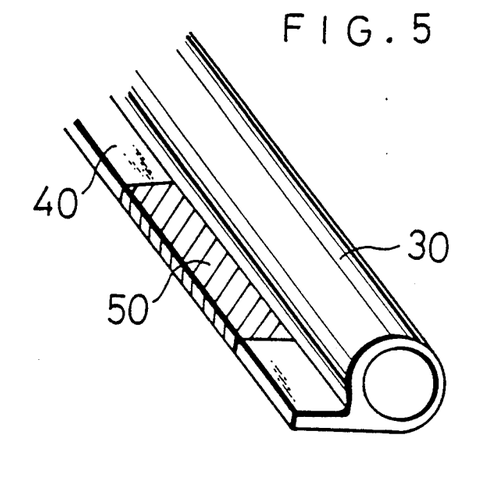
FIG. 5 is a fragmentary perspective view of a guide tube according to a third embodiment of this invention, which is suitable for use in a passive seat belt system.
Figure 6:
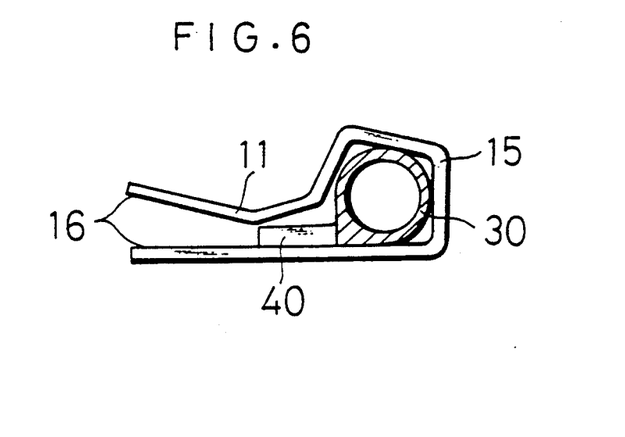
FIG. 6 is a bottom view of the guide tube of FIG. 5 fitted in a tube bracket.
Figure 7:
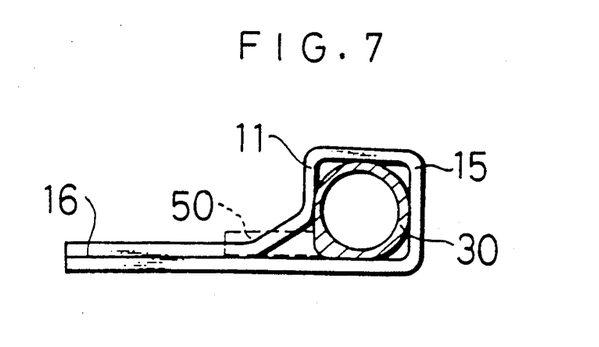
FIG. 7 is similar to FIG. 6 except that the tube bracket has been fixed on the guide tube.

The guide tube according to the third embodiment of this invention will next be described with reference to FIG. 5 through FIG. 7.

In these drawings, a strip-like flange 40 as a projection is formed on the second guide tube member 30 in the above-described first embodiment in such a way that the flange 40 extends in a direction perpendicular to the length of the second guide tube member 30. At a desired position of the flange 40, a cut-off portion 50 formed over a predetermined length by press cutting or the like is provided.

On the other hand, the tube bracket 11 for mounting the second guide tube member 30 on the vehicle body 6 is formed from a plate-like material by pressing or the like. The tube bracket 11 surrounds the second guide tube member 30 at a turned-over portion 15, and both edge portions 16, 16 are superposed one over the other.

To attach the second guide tube member 30 to the tube bracket 11, the edge portions 16, 16 of the tube bracket 11 are first opened to internally form a space large enough to insert the second guide tube member 30 thereinto. Thereafter, the second guide tube member 30 is inserted into the space.

Then, the tube bracket 11 is moved along the flange 40 to a point near the position where the cut-off portion 50 is formed. The edge portions 16, 16 of the tube bracket 11 are then allowed to close, whereby the upper edge portion 16 of the tube bracket 11 is fitted in the cut-off portion 50 formed in the flange 40 of the second guide tube member 30.

As a consequence, the position of the tube bracket 11 is automatically fixed by the cut-off portion 50 formed in the cut-off portion 40 of the second guide tube member 30. Positioning of the tube bracket 11 relative to the second guide tube member 30 is therefore no longer required, thereby making it possible to reduce the number of assembly steps of the tube bracket 11 to the second guide tube member 30 and thus to reduce the number of overall assembly steps.

In the third embodiment described above, no specific description has been made of the shape of the cut-off portion 50. It is not limited to such a rectangular shape as shown in FIG. 5 but may take any shape so long as it permits fitting of the tube bracket 11 therein. In short, the cut-off portion 50 may take any shape so long as it can achieve the positioning of the tube bracket 11 relative to the second guide tube member 30.

In the third embodiment described above, the strip-like flange 40 is formed on the second guide tube member 30 in such a way that the flange 40 extends in the direction perpendicular to the length of the guide tube member 30. The flange 40 is however not limited to such a structure. A flange may be formed on each side of the second guide tube member 30. The flange 40 may extend either continuously or intermittently along the length of the second guide tube member 30. Besides the strip-like flange 40, projections of various shapes such as a rod-like shape are also feasible. In short, any shape may be used so long as the flange 40 has the cut-off portion 50 adapted to fittingly receive the tube bracket 11 for achieving the positioning of the tube bracket 11.

Since the flange 40 can be formed with a synthetic resin or the like simultaneously with the formation of the second guide tube 30 by a one-piece forming technique, the provision of the flange 40 does not push up the production cost of the second guide tube member 30 substantially.

The third embodiment has been described as having the first and second guide tube members. It is however of course acceptable to form a tube-bracket-positioning cut-off portion in a guide tube which does not have such a double-wall structure but has a single-wall structure.

Figure 8:
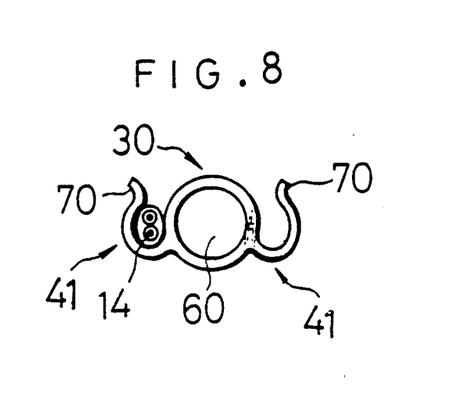
FIG. 8 is a transverse cross-section of a guide tube according to a fourth embodiment of this invention.

The guide tube according to the fourth embodiment of this invention will next be described with reference to FIG. 8.

Formed in the second guide tube member 30 in either the first or third embodiment is a guide channel 60 of a circular cross-section in which the first guide tube member 30 is inserted. Formed by a flange 41 provided as a projection on each side of the second guide tube member 30 is an insertion portion 70 having a substantially U-shaped cross-section and adapted to allow the wire harness 14 to extend therethrough.

Although not shown in the drawing, a cut-off portion similar to the cut-off portion 50 in the third embodiment is formed in at least one of the flanges 41.

The flanges 41 having the insertion portion 70 are formed on both sides of the second guide tube member 30 respectively to allow the formation of plural insertion portions in accordance with the kinds of wire harnesses or to give freedom or flexibility for the arrangement of the wire harness 14. They may of course be used for other wiring. The guide channel 60 and insertion portions 70, 70 are formed integrally as the second guide tube member 30 over the entire length of the second guide tube member 30.

According to the above construction, the insertion portions 70, 70 in each of which the wire harness 14 may be inserted are formed respectively in the flanges 41 of the second guide tube member 30. It is thus unnecessary to provide the wire harness 14 separately from the second guide tube member 30. It is only necessary to insert the wire harness 14 into one of the insertion portions 70, 70 formed respectively in the flanges 41, 41 of the second guide tube member 30. It is therefore possible to reduce the number of assembly steps, thereby making it possible to facilitate the assembly work and also to reduce the assembly cost.

In addition, the flanges 41, 41 equipped with their corresponding insertion portions 70, 70 can be formed with a synthetic resin or the like by a one-piece forming technique or the like simultaneously with the formation of the second guide tube member 30. The provision of the flanges 41, 41 does not therefore increase the production cost of the second guide tube member 30 substantially.

Incidentally, it is preferable to impart resiliency to the insertion portions 70, 70, because this permits one-touch assembly of the wire harness 14 and can thus facilitate the assembly work and reduce the assembling and manufacturing cost.

Figure 9:
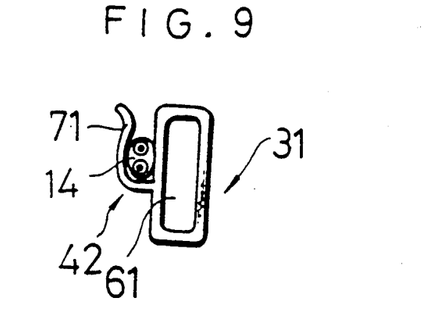
FIG. 9 is a transverse cross-section of a guide tube according to a fifth embodiment of this invention.

A second guide tube 31 according to the fifth embodiment of this invention is depicted in FIG. 9. In the drawing, the second guide tube member 31 defines a guide channel 60 having a transverse cross-section in the form of a substantially rectangular frame, in which the first guide tube member 20 is inserted, and has a flange 42 formed as a projection on one side of the second guide tube 30. The flange 42 is bent upwards to have a substantially L-shaped cross-section, thereby defining an insertion portion 72 in which the wire harness 14 is inserted.

The remaining structure is similar to the corresponding structure of the fourth embodiment described above, and its description is hence omitted herein.

The construction of the fifth embodiment allows to reduce the assembling and manufacturing cost like the fourth embodiment described above.

Figure 10:
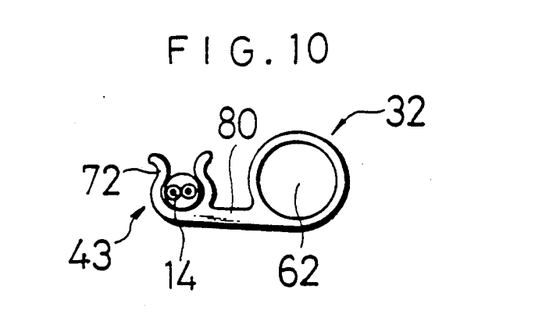
FIG. 10 is a transverse cross-section of a guide tube according to a sixth embodiment of this invention.

FIG. 10 depicts a second guide tube 32 according to the sixth embodiment of this invention.

In FIG. 10, the second guide tube member 32 defines a guide channel 62 having a circular transverse cross-section, in which the first guide tube member 20 is inserted, and has a flange 43 formed as a projection on one side of the second guide tube 32. The flange 43 is upwardly bifurcated at an edge portion thereof to have an inverted Ω-shaped transverse cross-section. Accordingly, the flange 43 has a connecting portion 80 and an insertion portion 72 in which the wire harness 14 is inserted.

The remaining structure is similar to the corresponding structure of the fourth embodiment described above, and its description is hence omitted herein.

The construction of the sixth embodiment allows to reduce the assembling and manufacturing cost like the fourth embodiment described above.

Figure 11:
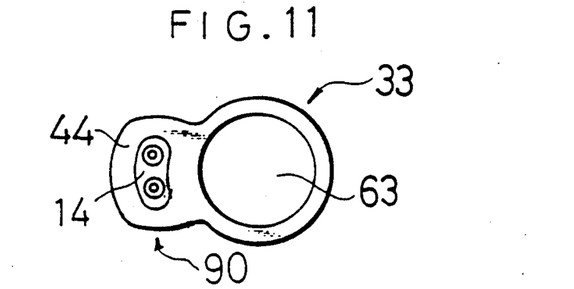
FIG. 11 is a transverse cross-section of a guide tube according to a seventh embodiment of this invention.

FIG. 11 depicts a second guide tube 33 according to the seventh embodiment of this invention.

In FIG. 11, the second guide tube member 33 defines a guide channel 63 having a circular transverse cross-section, in which the first guide tube member 20 is inserted, and has a bulge 44 formed as a projection on one side of the second guide tube 33. The bulge 44 defines a through hole 90 of an elongated oval transverse cross-section, in which the wire harness 14 is inserted.

The remaining structure is similar to the corresponding structure of the fourth embodiment described above, and its description is hence omitted herein.

The construction of the seventh embodiment allows to reduce the assembling and manufacturing cost like the fourth embodiment described above.

In the fourth to seventh embodiments described above, the second guide tube members 30, 31, 32, 33 have been described as having a transverse cross-sectional shape in the form of a ring or a substantially rectangular frame. Needless to say, the cross-sectional shapes of the guide channels 60, 61, 62, 63 are however not limited to these shapes and may take any desired cross-sectional shape conforming with the transverse cross-sectional shape of the first guide tube member 20. Further, the transverse cross-sectional shapes of the insertion portions 70, 71, 72, 90 are not limited to those described above. They may be grooves or channels or any desired transverse cross-sectional shape so long as the wire harness 14 can be inserted therein.

In the fourth to seventh embodiments, the insertion portions 70, 71, 72, 90 are formed over the entire lengths of the corresponding second guide tube member 30, 31, 32, 33 like the guide channels 60, 61, 62, 63. Needless to say, plural insertion portions may be provided spacedly at suitably locations along the length of the corresponding second guide tube member. In such an embodiment, one or more flanges defining a cut-off portion like the flange 40 with the cut-off portion 50 alone in the third embodiment may be formed using sections where the insertion portion 70 is not formed.

Further, in the fourth to seventh embodiments, the insertion portions 70, 71, 72, 90 for the wire harness 14 are formed in the flanges 70, 71, 72 and the bulge 44 respectively. Regarding the positional relation between the flanges 41, 42, 43 and bulge 44 and their corresponding insertion portions 70, 71, 72, 90 in which the wire harness 14 is inserted, the flanges 41, 42, 43 and bulge 44 may be formed further outside the corresponding insertion portions 70, 71, 72, 90. In the fourth to seventh embodiments, a flange defining a cut-off portion like the flange 40 with the cut-off portion 50 alone in the third embodiment may be provided on the sides not provided with the flanges 41, 42, 43 and bulge 44 defining the insertion portions 70, 71, 72, 90 respectively.

When two or more projections are formed, in other words, when a cut-off portion and an insertion portion are formed in a continuous single projection, it is unnecessary to form the individual projections in a single plane. These projections can be formed at desired points on the outer circumferential wall of the guide-channel-defining part of the second guide tube member. Even when a single projection is formed, it is unnecessary to form it in the same plane. For example, it may be formed spirally on the outer circumferential wall of the guide-channel-defining part of the second guide tube member. Namely, the projection or projections may be arranged freely as desired.

Each of the fourth to seventh embodiments have been described as having the first and second guide tube members. Needless to say, it is also feasible to form a wire harness insertion portion in a guide tube having a single layer structure instead of such a double layer structure.

I claim:

1. In a guide tube for a passive seat belt system, said guide tube being adapted to be arranged along a vehicle body to guide a slider drive member, the improvement wherein the guide tube comprises a first guide tube member for allowing the slider drive member to extend therethrough and a second guide tube member having higher flexural rigidity than at least the first guide tube member and adapted to be mounted on the vehicle body by means of at least one tube bracket, and the first guide tube member is fitted within the second guide tube member.

2. In a guide tube for a passive seat belt system, said guide tube being adapted to be arranged along a vehicle body to guide a slider drive member, the improvement wherein the guide tube comprises a first guide tube member for allowing the slider drive member to extend therethrough and a second guide tube member having higher flexural rigidity than at least the first guide tube member and adapted to be mounted on the vehicle body by means of at least one tube bracket, and the first guide tube member is fitted within the second guide tube member; wherein at least one cut-off portion is formed in the second guide tube member in such a way that said cut-off portion extends in a direction perpendicular to the length of the second guide tube member, whereby said tube bracket may be fittingly received in said cut-off portion.

3. The guide tube as claimed in claim 2, wherein the second guide tube member is provided with a projection extending in the direction perpendicular to the length of the second guide tube member and said at least one cut-off portion is formed in the projection.

4. In a guide tube for a passive seat belt system, said guide tube being adapted to be arranged along a vehicle body to guide a slider drive member, the improvement wherein the guide tube comprises a first guide tube member for allowing the slider drive member to extend therethrough and a second guide tube member having higher flexural rigidity than at least the first guide tube member and adapted to be mounted on the vehicle body by means of at least one tube bracket, and the first guide tube member is fitted within the second guide tube member;
wherein the second guide tube member has an insertion portion formed integrally therewith and adapted to receive and hold a wire harness therein.

5. A guide tube for a passive seat belt system, said guide tube being adapted to be arranged along a vehicle body to guide a slider drive member, the improvement wherein at least one cut-off portion is formed in the guide tube in such a way that said cut-off portion extends in a direction perpendicular to the length of the guide tube, whereby a tube bracket may be fittingly received in said cut-off portion.

6. The guide tube as claimed in claim 5, wherein the guide tube is provided with a projection extending in the direction perpendicular to the length of the guide tube and said at least one cut-off portion is formed in the projection.

7. The guide tube as claimed in claim 5, wherein the guide tube has an insertion portion formed integrally therewith and adapted to receive and hold a wire harness therein.

8. A flexible guide tube for a passive seat belt system, said flexible guide tube being adapted to be arranged along a vehicle body to guide a slider drive member and comprising a tube portion and an insertion portion formed integrally with said tube portion and adapted to receive a wire harness therein.

* * * * *